(12) United States Patent
Shibata et al.

(10) Patent No.: US 9,776,160 B2
(45) Date of Patent: Oct. 3, 2017

(54) CATALYST RECOVERY SYSTEM, HYDROCARBON SYNTHESIS REACTION APPARATUS, HYDROCARBON SYNTHESIS REACTION SYSTEM, AND CATALYST RECOVERY PROCESS

(75) Inventors: Toshiyuki Shibata, Tokyo (JP); Hidekatsu Honda, Natori (JP); Akira Kawamura, Iwakuni (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 1083 days.

(21) Appl. No.: 13/978,772

(22) PCT Filed: Jan. 13, 2012

(86) PCT No.: PCT/JP2012/050560
§ 371 (c)(1),
(2), (4) Date: Sep. 23, 2013

(87) PCT Pub. No.: WO2012/096366
PCT Pub. Date: Jul. 19, 2012

(65) Prior Publication Data
US 2014/0004011 A1    Jan. 2, 2014

(30) Foreign Application Priority Data
Jan. 13, 2011    (JP) .................................. 2011-004752

(51) Int. Cl.
*B01J 8/00* (2006.01)
*B01J 20/34* (2006.01)
(Continued)

(52) U.S. Cl.
CPC .......... *B01J 19/06* (2013.01); *B01D 21/0045* (2013.01); *B01D 21/0048* (2013.01);
(Continued)

(58) Field of Classification Search
CPC . B01J 20/34; B01J 8/125; B01J 8/0045; B01J 38/00; B01D 21/0045; B01D 21/0048; C10G 2/32; C10G 2/343
(Continued)

(56) References Cited

U.S. PATENT DOCUMENTS 2,247,820 A * 7/1941 Ruthruff ................ B01J 13/006
                                                                252/380
3,008,946 A * 11/1961 Rhodes .................... C08J 3/212
                                                                521/47
(Continued)

FOREIGN PATENT DOCUMENTS

CN    101835876 A    9/2010
JP    2004-537395 A  12/2004
(Continued)

OTHER PUBLICATIONS

Office Action issued Jun. 17, 2014 in CN Application No. 201280004913.X.
(Continued)

*Primary Examiner* — Walter D Griffin
*Assistant Examiner* — Huy-Tram Nguyen
(74) *Attorney, Agent, or Firm* — Panitch Schwarze Belisario & Nadel LLP

(57) ABSTRACT

A catalyst recovery system that includes a concentrated slurry production unit that concentrates a slurry extracted
(Continued)

from a reactor main unit and continuously produces a concentrated slurry, a first discharge unit that discharges the concentrated slurry from the concentrated slurry production unit, a solidified slurry production unit that cools the concentrated slurry discharged from the concentrated slurry production unit, thereby solidifying the liquid medium within the concentrated slurry and producing a solidified slurry, and a recovery mechanism that recovers the solidified slurry from the solidified slurry production unit.

20 Claims, 3 Drawing Sheets

(51) Int. Cl.
　　 B01J 19/06　　(2006.01)
　　 C10G 2/00　　(2006.01)
　　 B01J 38/00　　(2006.01)
　　 B01D 21/00　　(2006.01)
(52) U.S. Cl.
　　 CPC ............. B01J 8/0045 (2013.01); B01J 38/00 (2013.01); C10G 2/32 (2013.01); C10G 2/342 (2013.01); C10G 2/343 (2013.01); B01J 2219/0077 (2013.01); B01J 2219/185 (2013.01); B01J 2219/1943 (2013.01); B01J 2219/1946 (2013.01); C10G 2300/4081 (2013.01); C10G 2300/70 (2013.01)
(58) Field of Classification Search
　　 USPC ........................................ 422/129, 255, 261
　　 See application file for complete search history.

(56) References Cited

U.S. PATENT DOCUMENTS

| 4,294,624 A * | 10/1981 | Veltman ................ C13B 30/028 127/30 |
| 5,520,890 A | 5/1996 | Lorentzen et al. |
| 6,974,842 B1 * | 12/2005 | Spena ...................... C10G 2/32 518/700 |
| 2003/0109591 A1 * | 6/2003 | Zhou ...................... B01J 23/745 518/719 |
| 2009/0065437 A1 * | 3/2009 | Mohedas ................. B01J 8/005 210/695 |
| 2009/0095690 A1 * | 4/2009 | McCabe ............ B01D 19/0042 210/744 |
| 2011/0200492 A1 | 8/2011 | Onishi et al. |

FOREIGN PATENT DOCUMENTS

| JP | 2006-022283 A | 1/2006 |
| JP | 2009-214013 A | 9/2009 |
| JP | 2009-221299 A | 10/2009 |
| WO | 02/085508 A2 | 10/2002 |
| WO | 2010/038400 A1 | 4/2010 |
| WO | 2012-023527 A1 | 2/2012 |

OTHER PUBLICATIONS

Int'l Search Report issued Apr. 24, 2012 in Int'l Application No. PCT/JP2012/050560.
Notice of Allowance issued Jan. 20, 2015 in JP Application No. 2011-004752.
Office Action issued Apr. 10, 2014 in CA Application No. 2,823,682.

* cited by examiner

US 9,776,160 B2

CATALYST RECOVERY SYSTEM, HYDROCARBON SYNTHESIS REACTION APPARATUS, HYDROCARBON SYNTHESIS REACTION SYSTEM, AND CATALYST RECOVERY PROCESS

CROSS-REFERENCE TO RELATED APPLICATION

This application is a Section 371 of International Application No. PCT/JP2012/050560, filed Jan. 13, 2012, which was published in the Japanese language on Jul. 19, 2012, under International Publication No. WO 2012/096366 A1, and the disclosure of which is incorporated herein by reference.

BACKGROUND OF THE INVENTION

Field of the Invention

The present invention relates to a catalyst recovery system, a hydrocarbon synthesis reaction apparatus and hydrocarbon synthesis reaction system, and a catalyst recovery process.

Priority is claimed on Japanese Patent Application No. 2011-004752, filed Jan. 13, 2011, the content of which is incorporated herein by reference.

Description of Related Art

In recent years, as a process for synthesizing liquid fuels from natural gas, the GTL (Gas To Liquids: liquid fuels synthesis) technique has been developed. This GTL technique includes the steps of reforming a natural gas to produce a synthesis gas containing a carbon monoxide gas (CO) and a hydrogen gas ($H_2$) as main components, synthesizing hydrocarbons using this synthesis gas as a feedstock and using a catalyst via the Fischer-Tropsch synthesis reaction (hereinafter also referred to as the "FT synthesis reaction"), and then hydrogenating and fractionating these hydrocarbons to produce liquid fuel products such as naphtha (raw gasoline), kerosene, gas oil and wax and the like.

In the hydrocarbon synthesis reaction apparatus used in this GTL technique, the hydrocarbons are synthesized by subjecting the carbon monoxide gas and hydrogen gas within the synthesis gas to an FT synthesis reaction inside a reactor main unit that contains a slurry prepared by suspending solid catalyst particles (such as a cobalt catalyst) in a liquid medium (for example, liquid hydrocarbons or the like).

In recent years, a variety of catalyst recovery systems have been investigated for separating and recovering, from the reaction slurry, those catalyst particles that have degraded due to the heat caused by the reactions that occur during the FT synthesis reaction process, friction between the catalyst particles and the inner walls of the feed passages, or other external factors.

A known example of this type of catalyst recovery system is the configuration disclosed in Patent Document 1 described below. This catalyst recovery system includes a first line for extracting the slurry from the reactor main unit, a storage tank for storing the extracted slurry, a second line for treating the slurry within the storage tank, and a plurality of filters provided within the second line from the upstream side of the line toward the downstream side.

CITATION LIST

Patent Document

[Patent Document 1] International Patent Publication 2010-038400 pamphlet

SUMMARY OF THE INVENTION

Technical Problem

However, in the conventional catalyst recovery system described above, the catalyst particles are separated by filters from a slurry that has first been stored in a storage tank, and because the storage tank and the filters installed outside the storage tank must be provided, the catalyst recovery system is large and complex.

Further, when the catalyst particles that have been separated from the slurry are discharged, because solid-state catalyst particles that have been filtered off by the filters must be discharged, not only must filtering of the slurry by the filters be halted, but considerable manual operations must also be performed, meaning the recovery process suffers from poor efficiency.

Moreover, when the solid-state catalyst particles are discharged, the catalyst particles are prone to heat generation caused by oxidation, and therefore treating the discharged catalyst particles is difficult.

The present invention has been developed in light of the above circumstances, and has an object of providing a catalyst recovery system which can be simplified and reduced in size, is capable of recovering catalyst particles with good efficiency, and is able to suppress the oxidation of the discharged catalyst particles.

Solution to Problem

The catalyst recovery system according to the present invention is a system for recovering catalyst particles incorporated within a slurry contained inside a reactor main unit, wherein the catalyst recovery system includes a concentrated slurry production unit that concentrates the slurry extracted from the reactor main unit and continuously produces a concentrated slurry, a first discharge unit that discharges the concentrated slurry from the concentrated slurry production unit, a solidified slurry production unit that cools the concentrated slurry discharged from the concentrated slurry production unit, thereby solidifying the liquid medium within the concentrated slurry and producing a solidified slurry, and a recovery mechanism that recovers the solidified slurry from the solidified slurry production unit.

Further, a catalyst recovery process according to the present invention is a process for recovering catalyst particles incorporated within a slurry contained inside a reactor main unit, wherein the catalyst recovery process includes a concentrated slurry production step of concentrating the slurry extracted from the reactor main unit and continuously producing a concentrated slurry, a solidified slurry production step of cooling the concentrated slurry, thereby solidifying the liquid medium within the concentrated slurry and producing a solidified slurry, and a recovery step of recovering the solidified slurry.

In the above aspects of the present invention, the slurry extracted from the reactor main unit is concentrated by the concentrated slurry production unit, thereby continuously producing a concentrated slurry, and the concentrated slurry is discharged from the concentrated slurry production unit by the first discharge unit. Subsequently, the liquid medium is solidified by the solidified slurry production unit, thereby producing a solidified slurry, and the solidified slurry is then recovered by the recovery mechanism. In the solidified slurry, the surface of the catalyst particles is coated with the solidified liquid medium.

By employing the invention described above, the catalyst particles can be recovered from the slurry extracted from the reactor main unit by separating a concentrated slurry containing the catalyst particles.

Because the concentrated slurry production unit produces the concentrated slurry continuously, the concentrated slurry can continue to be produced, and the catalyst particles separated from the concentrated slurry, while the slurry is still being extracted, without having to halt the extraction of the slurry from the reactor main unit. Accordingly, unlike the conventional technique described above, separation of the catalyst particles from the slurry can be performed without first storing the slurry in a storage tank, meaning the catalyst recovery system need not be provided with a storage tank or filters installed outside the storage tank, thus enabling the catalyst recovery system to be simplified and reduced in size.

The first discharge unit discharges a concentrated slurry that exhibits superior fluidity to solid catalyst particles, and therefore the discharge operation can be simplified. As a result, the catalyst particles can be separated from the slurry with good efficiency.

Moreover, in the recovery mechanism, the concentrated slurry is recovered as a solidified slurry in which the surface of the catalyst particles is coated with the solidified liquid medium, and therefore contact between the discharged catalyst particles and the air can be suppressed, enabling oxidation of the catalyst particles to also be suppressed.

Furthermore, in the catalyst recovery system according to the present invention, the concentrated slurry production unit may include a settling tank, wherein the slurry inside the settling tank is concentrated by the catalyst particles settling within the lower portion of the liquid medium, and the settled slurry is then separated into the resulting concentrated slurry and a clarified slurry having a lower catalyst particle content than the concentrated slurry.

In this case, because the concentrated slurry production unit includes the settling tank, the concentrated slurry can be produced continuously by the settling process, enabling the catalyst recovery system to be further simplified.

Further, in the catalyst recovery system according to the present invention, the settling tank may be provided with a supply port through with the slurry is supplied, a discharge port to which the first discharge unit is connected, and an extraction port through which the clarified slurry is extracted, wherein the inside of the settling tank is provided with a partitioning wall, which partitions the inside of the settling tank into a lower chamber, to which the supply port and the discharge port are connected and which is located within the lower portion of the tank, and an upper chamber to which the extraction port is connected and which is located within the upper portion of the tank, and a connection passage that passes through the partitioning wall and interconnects the lower chamber and the upper chamber.

In this case, when the slurry is supplied from the supply port to the lower chamber, the catalyst particles within the slurry settle, and the slurry is separated into the concentrated slurry and the clarified slurry within the lower chamber. The concentrated slurry is discharged from the discharge port by the first discharge unit. On the other hand, the clarified slurry is forced out of the lower chamber as more slurry is supplied from the supply port, and passes through the connection passage and the upper chamber before being extracted from the extraction port.

As described above, by providing the partitioning wall and the connection passage inside the settling tank, the concentrated slurry can be discharged from the settling tank, while the clarified slurry is also extracted from the settling tank.

Further, in the catalyst recovery system according to the present invention, the partitioning wall mentioned above may be inclined in a downward direction from the supply port toward the central axis of the settling tank.

In this case, because the partitioning wall is inclined in a downward direction from the supply port toward the central axis of the settling tank, the flow direction of the slurry supplied to the lower chamber from the supply port can be directed downward. As a result, the catalyst particles within the slurry are able to settle more effectively.

Furthermore, in the catalyst recovery system according to the present invention, an inclined wall that is inclined in a downward direction from the supply port toward the central axis of the settling tank may be disposed inside the settling tank beneath the partitioning wall, with a space provided between the inclined wall and the partitioning wall, and the angle of inclination of the inclined wall may be at least as large as the angle of repose of the catalyst particles.

In this case, the slurry supplied from the supply port is directed in a downward flow direction by the partitioning wall, and flows down between the space between the partitioning wall and the inclined wall. At this time, at least a portion of the catalyst particles within the slurry settle on top of the inclined wall. However, because the angle of inclination of the inclined wall is at least as large as the angle of repose of the catalyst particles, those catalyst particles that have settled on top of the inclined wall continue to descend smoothly down the inclined wall.

Accordingly, because the angle of inclination of the inclined wall is at least as large as the angle of repose of the catalyst particles, at least a portion of the catalyst particles within the slurry are able to descend smoothly along the inclined wall, enabling more effective settling of the catalyst particles.

Further, in the catalyst recovery system according to the present invention, a regulation device that restricts the catalyst particles from ascending through the connection passage may be provided within the connection passage.

In this case, because the regulation device is provided within the connection passage, catalyst particles can be inhibited from ascending through the connection passage together with the clarified slurry flowing through the inside of the connection passage, thereby suppressing the introduction of catalyst particles into the upper chamber.

Moreover, in the catalyst recovery system according to the present invention, the regulation device mentioned above may include a baffle plate that extends from the inner peripheral surface of the connection passage, and this baffle plate may be inclined in a downward direction from the inner peripheral surface of the connection passage toward the passage axis of the connection passage.

In this case, because the baffle plate is inclined in a downward direction from the inner peripheral surface of the connection passage toward the passage axis of the connection passage, the problem of catalyst particles ascending through the connection passage can be reliably regulated.

Further, in the catalyst recovery system according to the present invention, an oil collection tube, the inside of which is connected to the extraction port and which blocks connection between the extraction port and the upper chamber, may be provided inside the upper chamber, a through-hole that interconnects the inside of the oil collection tube and the upper chamber may be provided in the oil collection tube, and the flow surface area of the through-hole may be larger than the flow surface area of the extraction port.

In this case, the clarified slurry inside the upper chamber passes through the through-hole and the oil collection tube before being extracted from the extraction port. Because the flow surface area of the through-hole is larger than the flow surface area of the extraction port, the flow rate of the clarified slurry as it passes through the through-hole is lower than the flow rate of the clarified slurry as it is extracted from the extraction port. As a result, catalyst particles within the clarified slurry can be inhibited from flowing through the through-hole and entering the oil collection tube, meaning discharge of catalyst particles from the extraction port can be suppressed.

Furthermore, in the catalyst recovery system according to the present invention, the settling tank may include a tank heating device that heats the inside of the settling tank.

In this case, because the settling tank includes the tank heating device, the liquid medium within the slurry inside the settling tank can be prevented from falling in temperature and solidifying, thus enabling more reliable settling of the catalyst particles within the slurry.

Furthermore, in the catalyst recovery system according to the present invention, an interface detection device that detects the settling interface of the concentrated slurry inside the settling tank may be provided in the settling tank.

In this case, because this interface detection device is provided in the settling tank, the first discharge unit can be operated on the basis of the detected settling interface for the concentrated slurry, enabling the concentrated slurry to be discharged from the settling tank.

Moreover, in the catalyst recovery system according to the present invention, the first discharge unit may include a first upper line that discharges the concentrated slurry from the settling tank, a temporary hopper into which the concentrated slurry is discharged from the first upper line, a first lower line that discharges the concentrated slurry from the temporary hopper, a first upper valve that opens and closes the first upper line, and a first lower valve that opens and closes the first lower line.

In this case, when the concentrated slurry is discharged from the settling tank by the first discharge unit, the valves are initially set so that the first upper line and the first lower line are closed. First, the first upper valve is operated to open the first upper line, and the concentrated slurry inside the settling tank is discharged through the first upper line and into the temporary hopper. Subsequently, the first upper valve is operated to close the first upper line, the first lower valve is then operated to open the first lower line, and the concentrated slurry inside the temporary hopper is discharged through the first lower line.

By employing the above configuration, the concentrated slurry can be discharged from the settling tank without the inside of the settling tank being connected to the outside via the first discharge unit, and therefore the pressure inside the settling tank during discharge of the concentrated slurry can be stabilized.

Further, in the catalyst recovery system according to the present invention, the temporary hopper may include a hopper heating device that heats the inside of the temporary hopper.

In this case, because the temporary hopper includes this hopper heating device, the liquid medium within the concentrated slurry inside the temporary hopper can be prevented from falling in temperature and solidifying, thus enabling the concentrated slurry to be discharged more reliably from the temporary hopper.

Furthermore, in the catalyst recovery system according to the present invention, the temporary hopper may include a first hopper pressurization device that pressurizes the inside of the temporary hopper.

In this case, because the temporary hopper includes this first hopper pressurization device, the concentrated slurry inside the temporary hopper can be pressurized by the first hopper pressurization device, enabling the concentrated slurry to be discharged more reliably from the temporary hopper.

Moreover, in the catalyst recovery system according to the present invention, a clarified line through which the clarified slurry is extracted from the settling tank may be provided, and a pressure reducing valve that reduces the pressure of the clarified slurry inside the clarified line may be provided within the clarified line.

In this case, because the pressure reducing valve is provided within the clarified line, the pressure inside the settling tank can be prevented from falling when the clarified slurry is extracted from the settling tank through the clarified line, enabling the pressure inside the settling tank to be stabilized.

Further, the catalyst recovery system according to the present invention may also include a centrifugal separator to which the clarified slurry is supplied from the clarified line, and a second discharge unit that discharges a residual catalyst-containing slurry separated from the clarified slurry by the centrifugal separator, wherein the second discharge unit may include a second upper line that discharges the residual catalyst-containing slurry from the centrifugal separator, a residual catalyst hopper into which the residual catalyst-containing slurry is discharged from the second upper line, and a second lower line that discharges the residual catalyst-containing slurry from the residual catalyst hopper, and the residual catalyst hopper may include a second hopper pressurization device that pressurizes the inside of the residual catalyst hopper.

In this case, the residual catalyst-containing slurry separated from the clarified slurry by the centrifugal separator is discharged through the second upper line into the residual catalyst hopper, and is then discharged through the second lower line. Because the residual catalyst hopper includes the second hopper pressurization device, the residual catalyst-containing slurry inside the residual catalyst hopper can be pressurized by the second hopper pressurization device, enabling the residual catalyst-containing slurry to be discharged more reliably from the residual catalyst hopper.

Further, in the catalyst recovery system according to the present invention, the aforementioned solidified slurry production unit may include a cooling hopper into which the concentrated slurry is discharged and a cooling device that cools the inside of the cooling hopper, and the cooling hopper may be provided with a gas disposal line through which gas inside the cooling hopper is discarded.

In this case, the concentrated slurry is discharged from the concentrated slurry production unit into the cooling hopper and is cooled by the cooling device. At this time, gas is produced from the concentrated slurry inside the cooling hopper, and this gas is discarded through the gas disposal line.

In this manner, because the gas disposal line is provided within the cooling hopper, gas can be prevented from accumulating inside the cooling hopper.

Furthermore, in the catalyst recovery system according to the present invention, the aforementioned recovery mechanism may include a crushing device that crushes the solidified slurry.

In this case, because the recovery mechanism includes the crushing device, the solidified slurry can be crushed to a size that facilitates post-treatment, enabling the recovered solidified slurry to be more easily subjected to post-treatment.

A hydrocarbon synthesis reaction apparatus according to the present invention synthesizes hydrocarbon compounds by bringing a synthesis gas containing hydrogen gas and carbon monoxide gas as main components into contact with a slurry prepared by suspending solid catalyst particles within a liquid medium, and includes a reactor main unit that contains the slurry and is supplied with the synthesis gas, and the catalyst recovery system described above.

According to this aspect of the invention, because the hydrocarbon synthesis reaction apparatus is provided with a simpler and smaller catalyst recovery system, the apparatus can also be reduced in size and simplified.

A hydrocarbon synthesis reaction system according to the present invention includes the hydrocarbon synthesis reaction apparatus described above, a synthesis gas production unit that reforms a hydrocarbon feedstock to produce the synthesis gas and then supplies the synthesis gas to the reactor main unit, and an upgrading unit that produces liquid fuels from the hydrocarbon compounds.

According to this aspect of the present invention, because the hydrocarbon synthesis reaction system is provided with a simpler and smaller hydrocarbon synthesis reaction apparatus, the hydrocarbon synthesis reaction system can also be reduced in size and simplified.

Advantageous Effects of Invention

By employing the catalyst recovery system and the catalyst recovery process according to the present invention, the system can be simplified and reduced in size, the operation of recovering catalyst particles can be performed with good efficiency, and oxidation of the discharged catalyst particles can be suppressed.

Further, by employing the hydrocarbon synthesis reaction apparatus and the hydrocarbon synthesis reaction system according to the present invention, the apparatus and the system can be reduced in size and simplified.

DETAILED DESCRIPTION OF THE INVENTION

One embodiment of a liquid fuel synthesizing system according to the present invention is described below with reference to the drawings.

Figure 1:
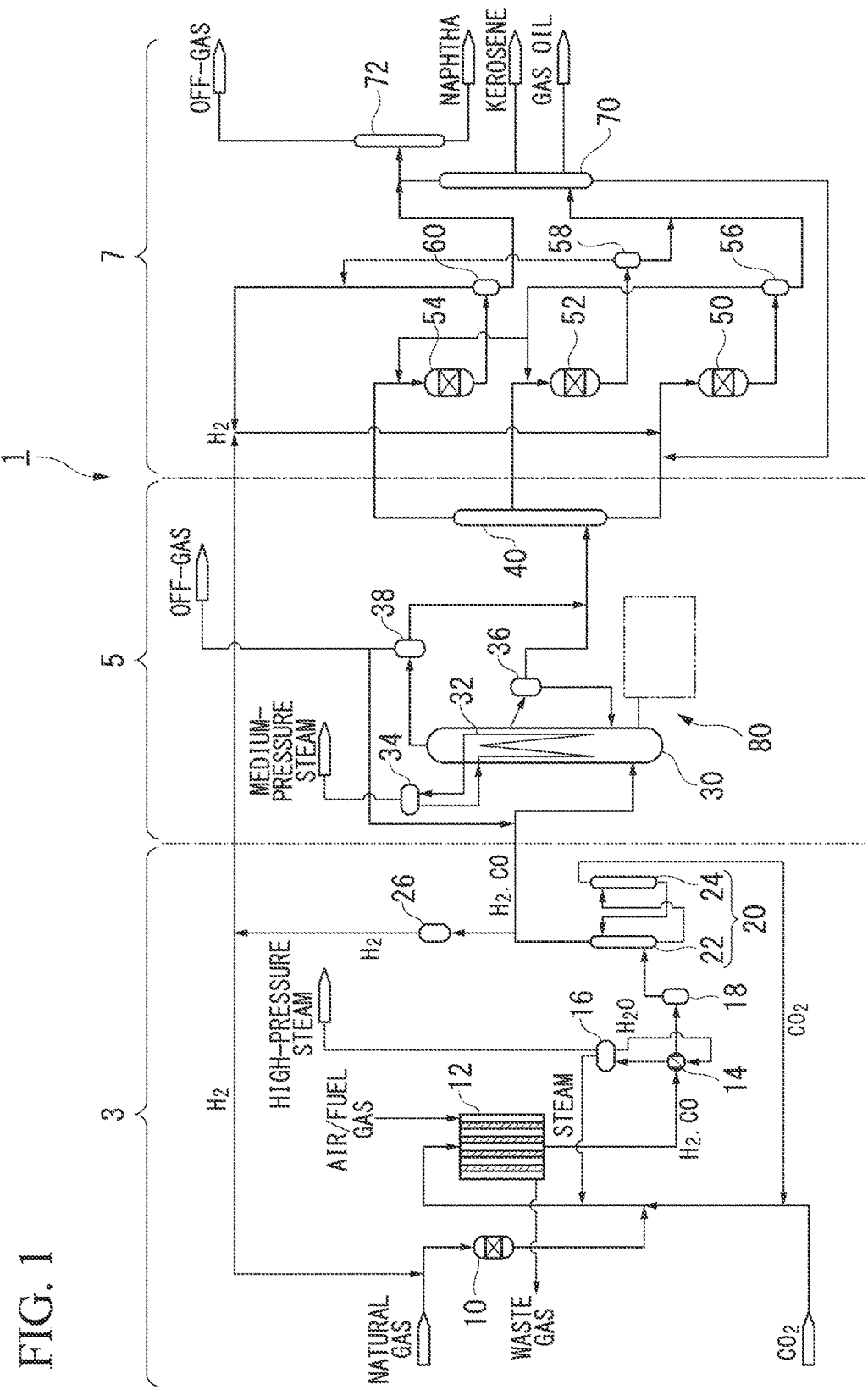
FIG. 1 is a schematic diagram illustrating the overall structure of a liquid fuel synthesizing system according to one embodiment of the present invention.

As illustrated in FIG. 1, the liquid fuel synthesizing system (hydrocarbon synthesis reaction system) 1 is a plant facility which carries out a GTL process that converts a hydrocarbon feedstock such as a natural gas into liquid fuels. This liquid fuel synthesizing system 1 includes a synthesis gas production unit 3, an FT synthesis unit (hydrocarbon synthesis reaction apparatus) 5, and an upgrading unit 7. The synthesis gas production unit 3 reforms a natural gas that functions as a hydrocarbon feedstock to produce a synthesis gas containing carbon monoxide gas and hydrogen gas. The FT synthesizing unit 5 synthesizes liquid hydrocarbon compounds from the produced synthesis gas via the FT synthesis reaction. The upgrading unit 7 hydrotreats the liquid hydrocarbon compounds synthesized by the FT synthesis reaction to produce liquid fuels and other products (such as naphtha, kerosene, gas oil, and wax). Structural elements of each of these units are described below.

First is a description of the synthesis gas production unit 3.

The synthesis gas production unit 3 is composed mainly of a desulfurization reactor 10, a reformer 12, a waste heat boiler 14, gas-liquid separators 16 and 18, a $CO_2$ removal unit 20, and a hydrogen separator 26. The desulfurization reactor 10 is composed of a hydrodesulfurizer and the like, and removes sulfur components from the natural gas that functions as the feedstock. The reformer 12 reforms the natural gas supplied from the desulfurization reactor 10 to produce a synthesis gas containing carbon monoxide gas (CO) and hydrogen gas ($H_2$) as main components. The waste heat boiler 14 recovers waste heat from the synthesis gas produced in the reformer 12 to generate a high-pressure steam. The gas-liquid separator 16 separates the water that has been heated by heat exchange with the synthesis gas in the waste heat boiler 14 into a gas (high-pressure steam) and a liquid. The gas-liquid separator 18 removes a condensed component from the synthesis gas that has been cooled in the waste heat boiler 14, and supplies a gas component to the $CO_2$ removal unit 20. The $CO_2$ removal unit 20 has an absorption tower (second absorption tower) 22 and a regeneration tower 24. The absorption tower 22 uses an absorbent to absorb carbon dioxide gas from the synthesis gas supplied from the gas-liquid separator 18. The regeneration tower 24 releases the carbon dioxide gas absorbed by the absorbent, thereby regenerating the absorbent. The hydrogen separator 26 separates a portion of the hydrogen gas contained in the synthesis gas from which the carbon dioxide gas has already been separated by the $CO_2$ removal unit 20. In some cases, the above $CO_2$ removal unit 20 may not need to be provided.

In the reformer 12, for example, by utilizing a steam and carbon dioxide gas reforming method represented by the chemical reaction formulas (1) and (2) shown below, the natural gas is reformed by carbon dioxide and steam, and a high-temperature synthesis gas is produced which includes carbon monoxide gas and hydrogen gas as main components. However, the reforming method employed in the reformer 12 is not limited to this steam and carbon dioxide gas reforming method. For example, a steam reforming method, a partial oxidation reforming method (PDX) using oxygen, an autothermal reforming method (ATR) that is a combination of a partial oxidation method and a steam reforming method, or a carbon dioxide gas reforming method may also be used.

The hydrogen separator 26 is provided on a branch line that branches off a main line which connects the $CO_2$ removal unit 20 or the gas-liquid separator 18 with a bubble column reactor 30. This hydrogen separator 26 may be composed, for example, of a hydrogen PSA (Pressure Swing Adsorption) device that performs adsorption and desorption of hydrogen by utilizing a pressure difference. This hydrogen PSA device has adsorbents (such as a zeolitic adsorbent, activated carbon, alumina or silica gel) packed inside a plurality of adsorption towers (not shown in the drawing) that are arranged in parallel. By sequentially repeating each of the steps of hydrogen pressurization, adsorption, desorption (depressurization) and purging within each of these adsorption towers, the hydrogen PSA device can continuously supply a high-purity hydrogen gas (of approximately 99.999% purity) that has been separated from the synthesis gas.

The hydrogen gas separating method employed in the hydrogen separator 26 is not limited to the type of pressure swing adsorption method utilized by the above hydrogen PSA device, and for example, a hydrogen storing alloy adsorption method, a membrane separation method, or a combination thereof may also be used.

The hydrogen storing alloy method is a technique for separating hydrogen gas using, for example, a hydrogen storing alloy (such as TiFe, $LaNi_5$, $TiFe_{(0.7\ to\ 0.9)}Mn_{(0.3\ to\ 0.1)}$, or $TiMn_{1.5}$) that exhibits hydrogen adsorption and release properties upon cooling and heating respectively. In the hydrogen storing alloy method, for example, hydrogen adsorption by cooling the hydrogen storing alloy, and hydrogen release by heating the hydrogen storing alloy may be repeated alternately within a plurality of adsorption towers containing the hydrogen storing alloy. In this manner, hydrogen gas contained within the synthesis gas can be separated and recovered.

The membrane separation method is a method that uses a membrane composed of a polymer material such as an aromatic polyimide to separate hydrogen gas, which exhibits superior membrane permeability, from a mixed gas. Since the membrane separation method does not require a phase change of the separation target materials in order to achieve separation, less energy is required for the separation operation, meaning the running costs are low. Further, because the structure of a membrane separation device is simple and compact, the facility costs are low and the surface area required to install the facility is small. Moreover, there is no driving device in a separation membrane and the stable operating range is broad, which offers another advantage in that maintenance is comparatively easy.

Next is a description of the FT synthesis unit 5.

The FT synthesis unit 5 mainly includes, for example, the bubble column reactor (reactor main unit) 30, a gas-liquid separator 34, a separator 36, a gas-liquid separator 38, a first fractionator 40, and a catalyst recovery system 80. The bubble column reactor 30 uses the FT synthesis reaction to synthesize liquid hydrocarbon compounds from the synthesis gas produced by the aforementioned synthesis gas production unit 3, namely, from carbon monoxide gas and hydrogen gas. The gas-liquid separator 34 separates water that has been heated by passage through a heat transfer tube 32 disposed inside the bubble column reactor 30 into steam (medium-pressure steam) and a liquid. The separator 36 is connected to the middle section of the bubble column reactor 30, and separates the catalyst and the liquid hydrocarbon compounds. The gas-liquid separator 38 is connected to the top of the bubble column reactor 30 and cools any unreacted synthesis gas and gaseous hydrocarbon compounds. The first fractionator 40 fractionally distills the liquid hydrocarbon compounds that have been supplied from the bubble column reactor 30 via the separator 36 and the gas-liquid separator 38 into a series of fractions.

The bubble column reactor 30 is an example of a reactor that synthesizes liquid hydrocarbon compounds from a synthesis gas, and functions as an FT synthesis reactor that synthesizes liquid hydrocarbon compounds from the synthesis gas by the FT synthesis reaction. The bubble column reactor 30 is formed, for example, from a bubble column slurry bed type reactor in which a slurry composed mainly of catalyst particles and an oil medium (liquid medium, liquid hydrocarbons) is contained inside a column type vessel. This bubble column reactor 30 synthesizes gaseous or liquid hydrocarbon compounds from the synthesis gas by the FT synthesis reaction. Specifically, in the bubble column reactor 30, a synthesis gas that represents the feedstock gas is supplied as gas bubbles from a dispersion plate positioned in the bottom of the bubble column reactor 30, and these gas bubbles pass through the slurry, which has been formed by suspending catalyst particles in the oil medium. In this suspended state, the hydrogen gas and carbon monoxide gas contained within the synthesis gas react with each other to synthesize hydrocarbon compounds, as shown in the following chemical reaction formula (3).

[Chemical Formula 1]

$$2nH_2 + nCO \rightarrow CH_{2n} + nH_2O \qquad (3)$$

The catalyst particles have a larger specific gravity than the oil medium, and may undergo degradation due to factors such as heat generated during the FT synthesis reaction and friction between the catalyst particles and the inner walls of the lines. Further, because the FT synthesis reaction is an exothermic reaction, the bubble column reactor 30 is a heat exchange-type reactor having the heat transfer tube 32 disposed inside the reactor. The bubble column reactor 30 is supplied, for example, with water (BFW: Boiler Feed Water) as a coolant, so that the reaction heat of the FT synthesis reaction can be recovered in the form of a medium-pressure steam by heat exchange between the slurry and the water.

Next is a description of the upgrading unit 7. The upgrading unit 7 includes, for example, a wax fraction hydrocracking reactor 50, a middle fraction hydrotreating reactor 52, a naphtha fraction hydrotreating reactor 54, gas-liquid separators 56, 58 and 60, a second fractionator 70, and a naphtha stabilizer 72. The wax fraction hydrocracking reactor 50 is connected to the bottom of the first fractionator 40. The middle fraction hydrotreating reactor 52 is connected to a middle section of the first fractionator 40. The naphtha fraction hydrotreating reactor 54 is connected to the top of the first fractionator 40. The gas-liquid separators 56, 58 and 60 are provided so as to correspond to the hydrogenation reactors 50, 52 and 54 respectively. The second fractionator 70 fractionally distills the liquid hydrocarbon compounds supplied from the gas-liquid separators 56 and 58. The naphtha stabilizer 72 rectifies the liquid hydrocarbon compounds within the naphtha fraction supplied from the gas-liquid separator 60 and fractionally distilled in the second fractionator 70. As a result, the naphtha stabilizer 72 discharges butane and components lighter than butane as an off-gas, and recovers components having a carbon number of five or greater as a naphtha product.

Next is a description of a process for synthesizing liquid fuels from a natural gas (GTL process) using the liquid fuel synthesizing system 1 having the structure described above.

A natural gas (the main component of which is $CH_4$) is supplied as a hydrocarbon feedstock to the liquid fuel synthesizing system 1 from an external natural gas supply source (not shown in the drawing), such as a natural gas field or a natural gas plant. The above synthesis gas production unit 3 reforms the natural gas to produce a synthesis gas (a mixed gas containing carbon monoxide gas and hydrogen gas as main components).

Specifically, first, the natural gas described above is supplied to the desulfurization reactor 10 together with the hydrogen gas separated by the hydrogen separator 26. In the desulfurization reactor 10, sulfur components included in the natural gas are converted into hydrogen sulfide by the introduced hydrogen gas and the hydrodesulfurization catalyst. Further, in the desulfurization reactor 10, the produced hydrogen sulfide is absorbed by a desulfurizing agent such as ZnO. By desulfurizing the natural gas in advance in this manner, reduction in the activity of the catalysts used in the reformer 12 and the bubble column reactor 30 due to sulfur can be prevented.

The natural gas (which may also include carbon dioxide) that has been desulfurized in this manner is supplied to the reformer 12 after mixing with carbon dioxide gas ($CO_2$) supplied from a carbon dioxide supply source (not shown in the drawing) and the steam generated in the waste heat boiler 14. In the reformer 12, the natural gas is reformed by the carbon dioxide gas and the steam via a steam-carbon dioxide reforming process, thereby producing a high-temperature synthesis gas including carbon monoxide gas and hydrogen gas as main components. At this time, a fuel gas and air for a burner installed in the reformer 12 are supplied to the reformer 12, and the combustion heat from the fuel gas in the burner is used to provide the necessary reaction heat for the above steam-carbon dioxide gas reforming reaction, which is an endothermic reaction.

The high-temperature synthesis gas (for example, 900° C., 2.0 MPaG) produced in the reformer 12 in this manner is supplied to the waste heat boiler 14, and is cooled (for example, to 400° C.) by heat exchange with the water circulating through the waste heat boiler 14, thereby recovering the waste heat from the synthesis gas. At this time, the water heated by the synthesis gas in the waste heat boiler 14 is supplied to the gas-liquid separator 16. In the gas-liquid separator 16, the water that has been heated by the synthesis gas is separated into a high-pressure steam (for example, 3.4 to 10.0 MPaG) and water. The separated high-pressure steam is supplied to the reformer 12 or other external devices, whereas the separated water is returned to the waste heat boiler 14.

Meanwhile, the synthesis gas that has been cooled within the waste heat boiler 14 is supplied to either the absorption tower 22 of the $CO_2$ removal unit 20 or the bubble column reactor 30, after a condensed liquid fraction has been separated and removed from the synthesis gas in the gas-liquid separator 18. In the absorption tower 22, carbon dioxide gas contained in the synthesis gas is absorbed by an absorbent contained within the absorption tower 22, thereby removing the carbon dioxide gas from the synthesis gas. The absorbent that has absorbed the carbon dioxide gas within the absorption tower 22 is discharged from the absorption tower 22 and introduced into the regeneration tower 24. This absorbent that has been introduced into the regeneration tower 24 is then heated, for example with steam, and subjected to a stripping treatment to release the carbon dioxide gas. The released carbon dioxide gas is discharged from the regeneration tower 24 and introduced into the reformer 12, where it can be reused for the above reforming reaction.

The synthesis gas produced in the synthesis gas production unit 3 in this manner is supplied to the bubble column reactor 30 of the above FT synthesis unit 5. At this time, the composition ratio of the synthesis gas supplied to the bubble column reactor 30 is adjusted to a composition ratio suitable for the FT synthesis reaction (for example, $H_2:CO=2:1$ (molar ratio)). In addition, the synthesis gas supplied to the bubble column reactor 30 is pressurized to a pressure suitable for the FT synthesis reaction (for example, approximately 3.6 MPaG) by a compressor (not shown in the drawing) provided in the line connecting the $CO_2$ removal unit 20 with the bubble column reactor 30.

Furthermore, a portion of the synthesis gas that has undergone separation of the carbon dioxide gas by the above $CO_2$ removal unit 20 is also supplied to the hydrogen separator 26. In the hydrogen separator 26, the hydrogen gas contained in the synthesis gas is separated by adsorption and desorption utilizing a pressure difference (hydrogen PSA) as described above. The separated hydrogen gas is supplied continuously from a gas holder or the like (not shown in the drawing) via a compressor (not shown in the drawing) to the various hydrogen-utilizing reactors (for example, the desulfurization reactor 10, the wax fraction hydrocracking reactor 50, the middle fraction hydrotreating reactor 52, and the naphtha fraction hydrotreating reactor 54) within the synthesis reaction system 1 that perform predetermined reactions using hydrogen.

Next, the FT synthesis unit 5 synthesizes liquid hydrocarbon compounds by the FT synthesis reaction from the synthesis gas produced in the above synthesis gas production unit 3.

Specifically, the synthesis gas that has undergone separation of the carbon dioxide gas by the above $CO_2$ removal unit 20 is introduced into the bubble column reactor 30, and flows through the slurry including the catalyst contained in the bubble column reactor 30. During this time within the bubble column reactor 30, the carbon monoxide and hydrogen gas contained within the synthesis gas react with each other by the aforementioned FT synthesis reaction, and hydrocarbon compounds are produced. Moreover, during this FT synthesis reaction, the reaction heat of the FT synthesis reaction is recovered by the water flowing through the heat transfer tube 32 of the bubble column reactor 30, and the water that has been heated by this reaction heat is vaporized into steam. This steam is supplied to the gas-liquid separator 34 and separated into condensed water and a gas fraction. The water is returned to the heat transfer tube 32, while the gas fraction is supplied to an external device as a medium-pressure steam (for example, 1.0 to 2.5 MPaG).

The liquid hydrocarbon compounds synthesized in the bubble column reactor 30 in this manner are discharged from the middle section of the bubble column reactor 30 as a slurry that includes catalyst particles, and this slurry is introduced into the separator 36. In the separator 36, the introduced slurry is separated into the catalyst (the solid fraction) and a liquid fraction containing the liquid hydrocarbon compounds. A portion of the separated catalyst is returned to the bubble column reactor 30, whereas the liquid fraction is introduced into the first fractionator 40. Gaseous by-products, including unreacted synthesis gas from the FT synthesis reaction and gaseous hydrocarbon compounds produced in the FT synthesis reaction, are discharged from the top of the bubble column reactor 30. The gaseous by-products discharged from the bubble column reactor 30 are introduced into the gas-liquid separator 38. In the gas-liquid separator 38, the gaseous by-products are cooled and separated into condensed liquid hydrocarbon compounds and a gas fraction. The separated liquid hydrocarbon compounds are discharged from the gas-liquid separator 38 and introduced into the first fractionator 40. The separated gas fraction is discharged from the gas-liquid separator 38, with a portion of the gas fraction being reintroduced into the bubble column reactor 30. In the bubble column reactor 30, the unreacted synthesis gases (CO and $H_2$) contained in this reintroduced gas fraction are reused for the FT synthesis reaction. Further, the remaining portion of the gas fraction discharged from the gas-liquid separator 38 may be used as an off-gas fuel, or fuels equivalent to LPG (Liquefied Petroleum Gas) may be recovered from the gas fraction.

In the first fractionator 40, the liquid hydrocarbon compounds (with various carbon numbers) supplied from the bubble column reactor 30 via the separator 36 and the gas-liquid separator 38 in the manner described above are fractionally distilled into a naphtha fraction (with a boiling point that is lower than approximately 150° C.), a middle fraction (with a boiling point of approximately 150 to 350° C.), and a wax fraction (with a boiling point that exceeds approximately 350° C.). The liquid hydrocarbon compounds of the wax fraction (mainly $C_{21}$ or higher) discharged from the bottom of the first fractionator 40 are introduced into the wax fraction hydrocracking reactor 50. The liquid hydrocarbon compounds of the middle fraction equivalent to kerosene and gas oil (mainly $C_{11}$ to $C_{20}$) discharged from the middle section of the first fractionator 40 are introduced into the middle fraction hydrotreating reactor 52. The liquid hydrocarbon compounds of the naphtha fraction (mainly $C_5$ to $C_{10}$) discharged from the top of the first fractionator 40 are introduced into the naphtha fraction hydrotreating reactor 54.

The wax fraction hydrocracking reactor 50 hydrocracks the liquid hydrocarbon compounds of the high-carbon number wax fraction (hydrocarbons of approximately $C_{21}$ or higher) discharged from the bottom of the first fractionator 40 by using the hydrogen gas supplied from the above hydrogen separator 26 to reduce the carbon number to 20 or less. In this hydrocracking reaction, C—C bonds of hydrocarbon compounds with a large carbon number are cleaved. This process converts the hydrocarbon compounds with a large carbon number to hydrocarbon compounds with a smaller carbon number. Further, in the wax fraction hydrocracking reactor 50, the reaction for hydroisomerizing linear saturated hydrocarbon compounds (normal paraffins) to produce branched saturated hydrocarbon compounds (isoparaffins) proceeds in parallel with the hydrocracking reaction. This improves the low-temperature fluidity of the wax fraction hydrocracked product, which is a required property for a fuel oil base stock. Moreover, in the wax fraction hydrocracking reactor 50, a hydrodeoxygenation reaction of oxygen-containing compounds such as alcohols, and a hydrogenation reaction of olefins, both of which may be contained within the wax fraction that functions as the feedstock, also proceed during the hydrocracking process. The products including the liquid hydrocarbon compounds produced by hydrocracking and discharged from the wax fraction hydrocracking reactor 50 are introduced into the gas-liquid separator 56, and separated into a gas and a liquid. The separated liquid hydrocarbon compounds are introduced into the second fractionator 70, and the separated gas fraction (which includes hydrogen gas) is introduced into the middle fraction hydrotreating reactor 52 and the naphtha fraction hydrotreating reactor 54.

In the middle fraction hydrotreating reactor 52, the liquid hydrocarbon compounds of the middle fraction equivalent to kerosene and gas oil, which have a mid-range carbon number (of approximately $C_{11}$ to $C_{20}$) and have been discharged from the middle section of the first fractionator 40, are hydrotreated. In the middle fraction hydrotreating reactor 52, hydrogen gas supplied from the hydrogen separator 26 via the wax fraction hydrocracking reactor 50 is used for the hydrotreating. In this hydrotreating reaction, olefins contained within the above liquid hydrocarbon compounds are hydrogenated to produce saturated hydrocarbon compounds, and oxygen-containing compounds such as alcohols contained within the liquid hydrocarbon compounds are hydrodeoxygenated and converted into saturated hydrocarbon compounds and water. Moreover, in this hydrotreating reaction, a hydroisomerization reaction that isomerizes linear saturated hydrocarbon compounds (normal paraffins) and converts them into branched saturated hydrocarbon compounds (isoparaffins) also proceeds, thereby improving the low-temperature fluidity of the product oil, which is a required property for a fuel oil. The product including the hydrotreated liquid hydrocarbon compounds is separated into a gas and a liquid in the gas-liquid separator 58. The separated liquid hydrocarbon compounds are introduced into the second fractionator 70, and the separated gas fraction (which includes hydrogen gas) is reused for the above hydrogenation reaction.

In the naphtha fraction hydrotreating reactor 54, the liquid hydrocarbon compounds of the naphtha fraction, which have a low carbon number (approximately $C_{10}$ or less) and have been discharged from the top of the first fractionator 40, are hydrotreated. In the naphtha fraction hydrotreating reactor 54, hydrogen gas supplied from the hydrogen separator 26 via the wax fraction hydrocracking reactor 50 is used for the hydrotreating. As a result, a product including the hydrotreated liquid hydrocarbon compounds is separated into a gas and a liquid in the gas-liquid separator 60. The separated liquid hydrocarbon compounds are introduced into the naphtha stabilizer 72, and the separated gas fraction (which includes hydrogen gas) is reused for the above hydrogenation reaction. In this naphtha fraction hydrotreating process, the main reactions that proceed are the hydrogenation of olefins and the hydrodeoxygenation of oxygen-containing compounds such as alcohols.

In the second fractionator 70, the liquid hydrocarbon compounds supplied from the wax fraction hydrocracking reactor 50 and the middle fraction hydrotreating reactor 52 in the manner described above are fractionally distilled into hydrocarbon compounds with a carbon number of $C_{10}$ or less (with boiling points lower than approximately 150° C.), a kerosene fraction (with a boiling point of approximately 150 to 250° C.), a gas oil fraction (with a boiling point of approximately 250 to 350° C.) and an uncracked wax fraction (with a boiling point exceeding approximately 350° C.) from the wax fraction hydrocracking reactor 50. The uncracked wax fraction is obtained from the bottom of the second fractionator 70, and this is recycled to a position upstream of the wax fraction hydrocracking reactor 50. Kerosene and gas oil are discharged from the middle section of the second fractionator 70. Meanwhile, gaseous hydrocarbon compounds of $C_{10}$ or less are discharged from the top of the second fractionator 70 and introduced into the naphtha stabilizer 72.

In the naphtha stabilizer 72, the hydrocarbon compounds of $C_{10}$ or less, which have been supplied from the naphtha fraction hydrotreating reactor 54 and fractionally distilled in the second fractionator 70, are distilled, and naphtha ($C_5$ to $C_{10}$) is obtained as a product. Accordingly, high-purity naphtha is discharged from the bottom of the naphtha stabilizer 72. Meanwhile, an off-gas including mainly hydrocarbon compounds with a predetermined carbon number or less ($C_4$ or less), which is not a targeted product, is discharged from the top of the naphtha stabilizer 72. This off-gas is used as a fuel gas, or alternatively, a fuel equivalent to LPG may be recovered from the off-gas.

Figure 2:
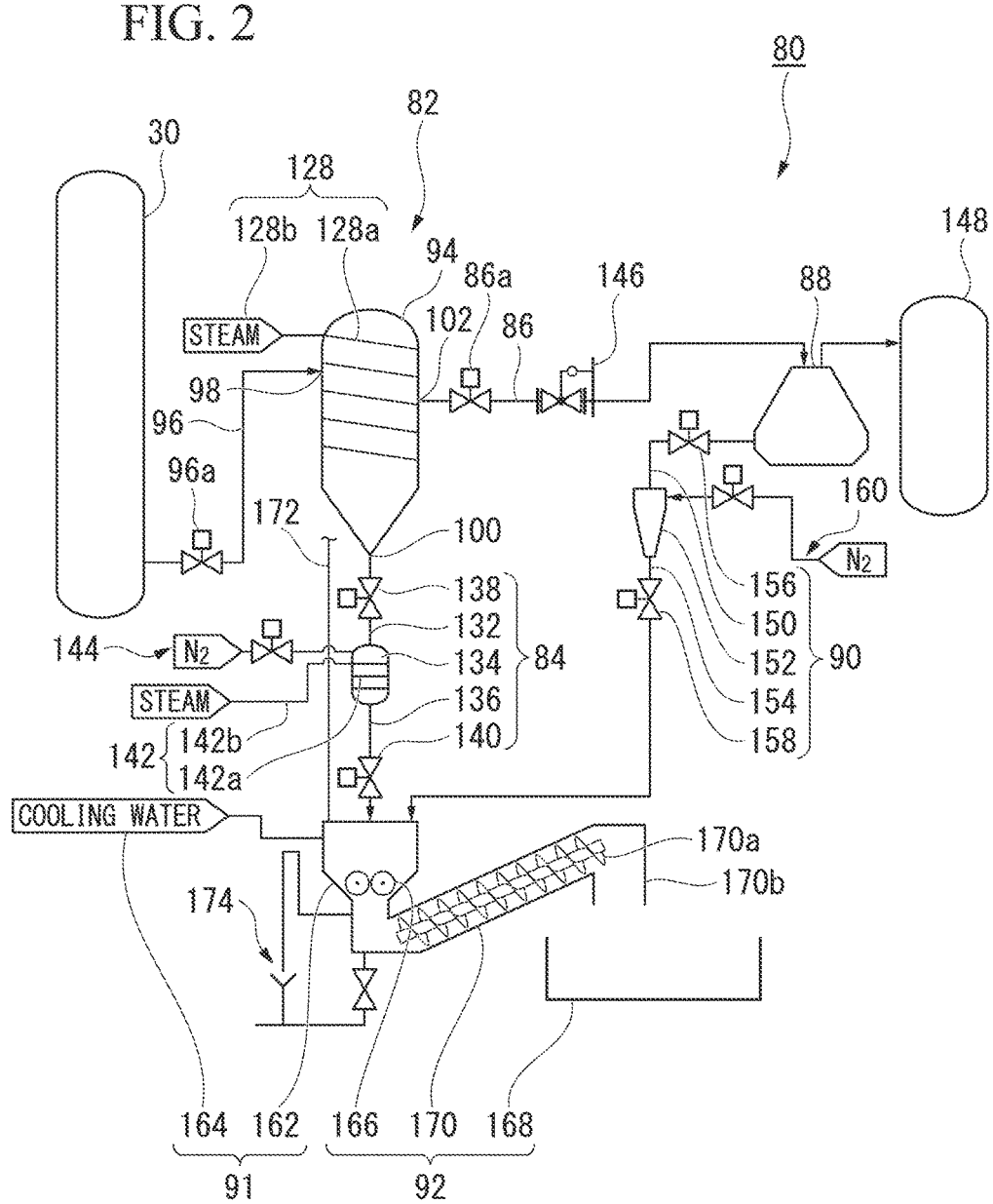
FIG. 2 is a schematic diagram illustrating the overall structure of a catalyst recovery system provided within the liquid fuel synthesizing system illustrated in FIG. 1.

Next is a description of the catalyst recovery system 80 provided within the FT synthesis unit 5 and illustrated in FIG. 2.

The catalyst recovery system 80 recovers the catalyst particles from the slurry contained in the bubble column reactor 30. This catalyst recovery system 80 includes a concentrated slurry production unit 82, a first discharge unit 84, a clarified line 86, a centrifugal separator 88, a second discharge unit 90, a solidified slurry production unit 91, and a recovery mechanism 92.

The concentrated slurry production unit 82 concentrates the slurry extracted from the bubble column reactor 30 to produce a concentrated slurry in a continuous manner. The concentrated slurry is discharged from the concentrated slurry production unit 82 through the first discharge unit 84. The clarified line 86 is used for extracting the clarified slurry, which has a lower catalyst particles content than the concentrated slurry, from the concentrated slurry production unit 82. The clarified slurry is supplied from the clarified line 86 to the centrifugal separator 88. A residual catalyst-containing slurry that is separated from the clarified slurry by the centrifugal separator 88 is discharged through the second discharge unit 90. The solidified slurry production unit 91 cools the concentrated slurry discharged from the concentrated slurry production unit 82 and the residual catalyst-containing slurry discharged from the centrifugal separator 88, thereby solidifying the oil medium and producing a solidified slurry. The solidified slurry is recovered from the solidified slurry production unit 91 by the recovery mechanism 92.

The concentrated slurry production unit 82 includes a settling tank 94 that separates the slurry into a concentrated slurry and a clarified slurry, and a slurry line 96, which connects the inside of the bubble column reactor 30 with the inside of the settling tank 94 and is provided with an open-close valve 96*a*.

Figure 3:
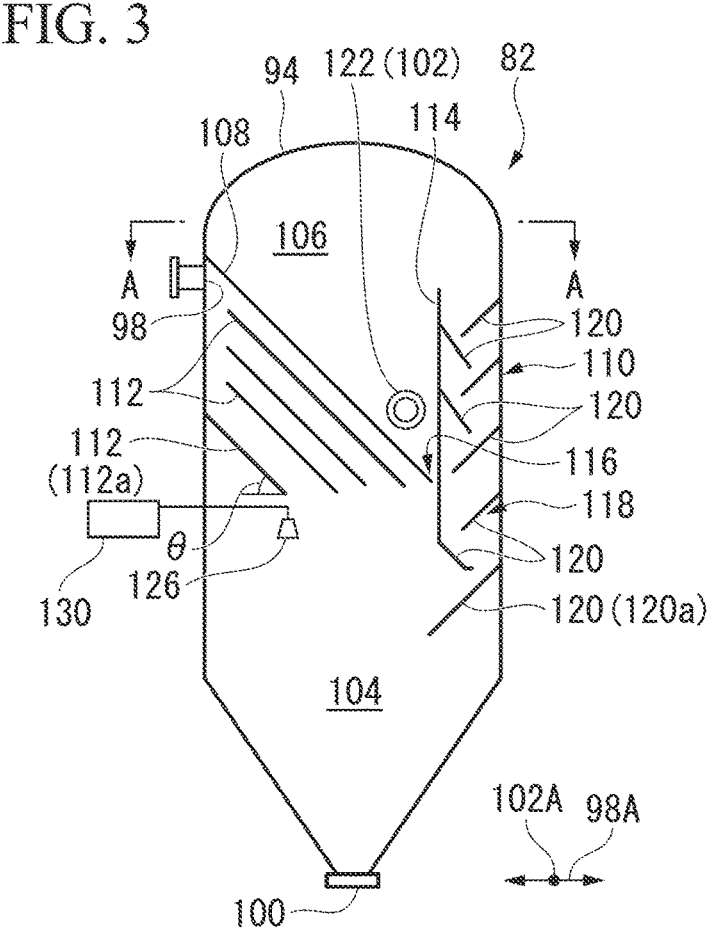
FIG. 3 is a longitudinal sectional view illustrating a settling tank within the catalyst recovery system illustrated in FIG. 2.

As illustrated in FIG. 3, the settling tank 94 is a cylindrical closed vessel that extends in a vertical direction, wherein the bottom wall section of the settling tank 94 is formed with a reverse taper that causes the vessel to gradually narrow in the downward direction, whereas the top wall section of the settling tank 94 bulges upward.

Figure 4:
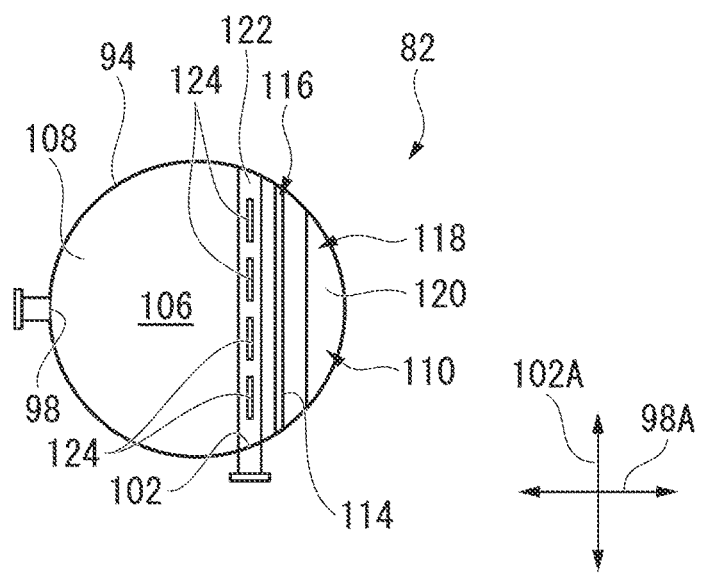
FIG. 4 is a cross-sectional view along the arrow A-A illustrated in FIG. 3.

As illustrated in FIG. 2 to FIG. 4, the settling tank 94 includes a supply port 98 through which the slurry is supplied, a discharge port 100 to which the first discharge unit 84 is connected, and an extraction port 102 through which the clarified slurry is extracted. The slurry line 96 is connected to the supply port 98, whereas the clarified line 86 is connected to the extraction port 102.

As illustrated in FIG. 3, the discharge port 100 is formed at the lower end of the bottom wall section of the settling tank 94, and opens up into the tank. The supply port 98 and the extraction port 102 are formed in the peripheral wall of the settling tank 94, and in the example illustrated in the drawings, the supply port 98 is located above the extraction port 102. Further, as illustrated in FIG. 4, the direction of opening 98A of the supply port 98 and the direction of opening 102A of the extraction port 102 are mutually orthogonal when viewed from above.

Furthermore, as illustrated in FIG. 3, the inside of the settling tank 94 is provided with a settling-promoting baffle (partitioning wall) 108, which partitions the inside of the settling tank 94 into a lower chamber, to which the supply port 98 and the discharge port 100 are connected and which is located within the lower portion of the tank, and an upper chamber 106 to which the extraction port 102 is connected and which is located within the upper portion of the tank, and a connection passage 110 that passes through the settling-promoting baffle 108 and interconnects the lower chamber 104 and the upper chamber 106.

The settling-promoting baffle 108 is inclined in a downward direction from the supply port 98 toward the central axis of the settling tank 94. As illustrated in FIG. 4, the shape of the settling-promoting baffle 108 when viewed from above is a reverse D-shape, wherein the curved portion of the outer peripheral edge of the settling-promoting baffle 108 is connected to the inner peripheral surface of the peripheral wall of the settling tank 94 along the entire length of the curve. Further, as illustrated in FIG. 3, the linear portion of the outer peripheral edge of the settling-promoting baffle 108 extends horizontally, forms the lower end of the settling-promoting baffle 108, and is distant from the inner peripheral surface of the peripheral wall of the settling tank 94. The upper end of the settling-promoting baffle 108 is positioned facing the supply port 98. An oil collection tube 122 described below is disposed immediately above the lower end of the settling-promoting baffle 108.

Inclined walls 112 that are inclined in a downward direction from the supply port 98 toward the central axis of the settling tank 94 are disposed inside the settling tank 94 beneath the settling-promoting baffle 108, with a space provided between the inclined walls 112 and the settling-promoting baffle 108. A plurality of the inclined walls 112 are provided (four in the example illustrated in the drawings) with spaces provided therebetween. These inclined walls 112 are parallel to the settling-promoting baffle 108 and are positioned at equal spacings beneath the settling-promoting baffle 108. In the example illustrated in the drawings, the angle of inclination θ of the inclined walls 112 relative to the horizontal plane is at least as large as the angle of repose of the catalyst particles (for example, approximately 30 degrees). Further, the lower ends of the inclined walls 112 are positioned at substantially the same height in the vertical direction as the lower end of the settling-promoting baffle 108.

Furthermore, among the plurality of inclined walls 112, the bottom inclined wall 112*a* located in the lowest position has a reverse D-shape when viewed from above, wherein the curved portion of the outer peripheral edge of the bottom inclined wall 112*a* is connected to the inner peripheral surface of the peripheral wall of the settling tank 94 along the entire length of the curve.

Moreover, among the plurality of inclined walls 112, the other inclined walls 112 positioned above the bottom inclined wall 112*a* are disposed such that a space exists between the upper end of each of these other inclined walls 112 and the inner peripheral surface of the peripheral wall of the settling tank 94.

A channel wall 114 that extends in a vertical direction is disposed in the space between the lower end of the settling-promoting baffle 108 (namely, the linear section of the outer peripheral edge of the settling-promoting baffle 108) and the inner peripheral surface of the peripheral wall of the settling tank 94. The lower end of the channel wall 114 is positioned within the lower chamber 104, whereas the upper end of the channel wall 114 is positioned within the upper chamber 106, at a position above the extraction port 102. The two side edges of the channel wall 114 are connected to the inner peripheral surface of the peripheral wall of the settling tank 94 along the entire length of the channel wall 114. A narrow space 116 is provided between the lower end of the settling-promoting baffle 108 and the channel wall 114. The space between the channel wall 114 and the inner peripheral surface of the peripheral wall of the settling tank 94 functions as the aforementioned connection passage 110.

A regulation device 118 that restricts the catalyst particles from ascending through the connection passage 110 is provided within the connection passage 110. The regulation device 118 includes a plurality of baffle plates (particle ascent-preventing baffles) 120 that extend from the inner peripheral surface of the connection passage 110. These baffle plates 120 are inclined in a downward direction from the inner peripheral surface of the connection passage 110 toward the passage axis of the connection passage 110, and a plurality of these baffle plates are provided in an alternating manner between the upper end of the connection passage 110 and the lower end of the connection passage 110. In the example illustrated in the drawings, each of the baffle plates 120 extends from the channel wall 114 or the peripheral wall of the settling tank 94, and among the plurality of baffle plates 120, the bottom baffle plate 120a located in the lowest position extends from the inner peripheral surface of the settling tank 94.

Further, as illustrated in FIG. 4, an oil collection tube 122, the inside of which is connected to the extraction port 102 and which blocks the connection between the extraction port 102 and the upper chamber 106, is provided inside the upper chamber 106. The oil collection tube 122 is disposed along the same axis as the extraction port 102, and through-holes 124 that connect the inside of the oil collection tube 122 and the upper chamber 106 are formed in the oil collection tube 122. In the example illustrated in the drawings, these through-holes 124 are formed as elongated holes, a plurality of which are provided along the length of the oil collection tube 122 with spaces provided between the individual holes. The flow surface area of the through-holes 124 is larger than the flow surface area of the extraction port 102. In those cases where a plurality of through-holes 124 are provided, the flow surface area of the through-holes 124 describes the sum of the flow surface area of each of the through-holes 124.

As illustrated in FIG. 2 and FIG. 3, the settling tank 94 is provided with an interface detection device 126 that detects the settling interface of the concentrated slurry inside the settling tank 94, and a tank heating device 128 that heats the inside of the settling tank 94.

As illustrated in FIG. 3, a control unit 130 that can control various settings within the catalyst recovery system 80 is connected electrically to the interface detection device 126. The concentrated slurry interface data detected by the interface detection device 126 are sent to this control unit 130.

As illustrated in FIG. 2, the tank heating device 128 includes a heat-conducting portion 128a that is wound around the outer peripheral surface of the settling tank 94, and a heat source supply unit 128b that supplies a heat source to the heat-conducting portion 128a. In the example illustrated in the drawing, the heat-conducting portion 128a is formed with a tube shape, and the heat source supply unit 128b supplies steam as the heat source to the inside of the heat-conducting portion 128a. Examples of the steam that can be used include the steam produced within other sections of the FT synthesis unit 5 (such as the gas-liquid separator 34). This tank heating device 128 may also have a configuration in which the heat-conducting portion 128a is formed from an electrically heated wire, with the heat source supply unit 128b supplying electrical energy to the heat-conducting portion 128a as the heat source.

The first discharge unit 84 includes a first upper line 132 that discharges the concentrated slurry from the settling tank 94, a temporary hopper 134 into which the concentrated slurry is discharged from the first upper line 132, a first lower line 136 that discharges the concentrated slurry from the temporary hopper 134, a first upper valve 138 that opens and closes the first upper line 132, and a first lower valve 140 that opens and closes the first lower line 136.

The temporary hopper 134 is provided with a hopper heating device 142 that heats the inside of the temporary hopper 134, and a first hopper pressurization device 144 that pressurizes the concentrated slurry inside the temporary hopper 134.

The hopper heating device 142 includes a heat-conducting portion 142a that is wound around the outer peripheral surface of the temporary hopper 134, and a heat source supply unit 142b that supplies a heat source to the heat-conducting portion 142a. In the example illustrated in the drawing, the heat-conducting portion 142a is formed with a tube shape, and the heat source supply unit 142b supplies steam as the heat source to the inside of the heat-conducting portion 142a. Examples of the steam that can be used include the steam produced within other sections of the FT synthesis unit 5 (such as the gas-liquid separator 34). This hopper heating device 142 may also have a configuration in which the heat-conducting portion 142a is formed from an electrically heated wire, with the heat source supply unit 142b supplying electrical energy to the heat-conducting portion 142a as the heat source.

The first hopper pressurization device 144 pressurizes the concentrated slurry inside the temporary hopper 134 by supplying an inert gas to the inside of the temporary hopper 134. In the example illustrated in the drawings, nitrogen gas is employed as the inert gas.

The clarified line 86 is provided with an open-close valve 86a that opens and closes the clarified line 86, and a pressure reducing valve 146 that reduces the pressure of the clarified slurry inside the clarified line 86, with these two valves provided in this order between the settling tank 94 and the centrifugal separator 88.

The centrifugal separator 88 has, for example, a vertical structure that performs a centrifugal separation of the clarified slurry into a residual catalyst-containing slurry and a separated oil. The residual catalyst-containing slurry contains the residual catalyst particles from within the clarified slurry, whereas the separated oil is even more clarified than the clarified slurry, and contains, for example, a very small amount of catalyst particles having a particle size of 0.1 μm or less and an oil medium.

A separated oil tank 148 for storing the separated oil is connected to the centrifugal separator 88.

The second discharge unit 90 includes a second upper line 150 that discharges the residual catalyst-containing slurry from the centrifugal separator 88, a residual catalyst hopper 152 into which the residual catalyst-containing slurry is discharged from the second upper line 150, a second lower line 154 that discharges the residual catalyst-containing slurry from the residual catalyst hopper 152, a second upper valve 156 that opens and closes the second upper line 150, and a second lower valve 158 that opens and closes the second lower line 154.

The residual catalyst hopper 152 is provided with a second hopper pressurization device 160 that pressurizes the residual catalyst-containing slurry inside the residual catalyst hopper 152.

The second hopper pressurization device 160 pressurizes the residual catalyst-containing slurry inside the residual catalyst hopper 152 by supplying an inert gas to the inside of the residual catalyst hopper 152. In the example illustrated in the drawings, nitrogen gas is employed as the inert gas.

The solidified slurry production unit 91 cools the discharged slurry that has been discharged into the solidified slurry production unit 91 and contains at least one of the concentrated slurry and the residual catalyst-containing slurry, thereby solidifying the oil medium within the discharged slurry and producing a solidified slurry. This solidified slurry production unit 91 includes a cooling hopper 162 into which the discharged slurry is discharged and a cooling device 164 that cools the inside of the cooling hopper 162.

The first lower line 136 of the first discharge unit 84 and the second lower line 154 of the second discharge unit 90 are connected to the cooling hopper 162. The cooling hopper 162 is also provided with a gas disposal line 172 through which gas inside the cooling hopper 162 can be discarded, and gas that flows into this gas disposal line 172 may, for example, be supplied to an external combustion facility (not shown in the drawings), where the gas may be combusted and then released into the atmosphere.

The cooling device 164 supplies cooling water into the cooling hopper 162.

The recovery mechanism 92 includes a crushing device 166 that crushes the solidified slurry, a catalyst-receiving tank 168 into which the solidified slurry is recovered, and a transport device 170 that transports the solidified slurry from the crushing device 166 to the catalyst-receiving tank 168.

The crushing device 166 is provided inside the cooling hopper 162. For example, a structure having a biaxial rotating screw mechanism may be employed as the crushing device 166.

The transport device 170 transports the solidified slurry while removing the cooling water from the slurry. In the example illustrated in the drawing, the transport device 170 is a screw conveyor which includes a screw 170a that transports the solidified slurry and a casing 170b that houses the screw 170a.

One end of the casing 170b is connected to the bottom opening of the cooling hopper 162, whereas the other end of the casing 170b is positioned above the catalyst-receiving tank 168 and opens downward. The casing 170b is inclined and rises gradually from one end to the other. In the example illustrated in the drawing, one end of the casing 170b is provided with a drain 174 for the cooling water of the cooling device 164.

Next is a description of the use of the catalyst recovery system 80 having the structure described above within a catalyst particles recovery process for separating and recovering catalyst particles from a slurry. Recovery of the catalyst particles is performed, for example, when operation of the FT synthesis unit 5 is stopped. Each of the steps described below may be performed automatically using the control unit 130, or performed manually by an operator using an operator control panel or the like not shown in the drawings.

The following description starts from a state in which the open-close valve 86a, the open-close valve 96a of the concentrated slurry production unit 82, the first upper valve 138 and the first lower valve 140 of the first discharge unit 84, and the second upper valve 156 and the second lower valve 158 of the second discharge unit 90 are all closed.

Further, it is assumed that the inside of the settling tank 94 is filled with a slurry, and that the pressure inside the settling tank 94 is substantially equal to the pressure (for example, approximately 3.6 MPaG) inside the bubble column reactor 30. Moreover, it is also assumed that the slurry inside the settling tank 94 has settled into a concentrated slurry and a clarified slurry, wherein the settling interface for the concentrated slurry is located inside the lower chamber 104.

First, a slurry that is extracted from the bubble column reactor 30 is subjected to a concentrated slurry production step of concentrating the slurry inside the settling tank 94 and continuously producing a concentrated slurry, and an extraction step of extracting the clarified slurry from the settling tank 94.

In the concentrated slurry production step, first, the open-close valve 96a within the slurry line 96 and the open-close valve 86a within the clarified line 86 are opened, and the slurry inside the bubble column reactor 30 is fed through the slurry line 96 and the supply port 98, and supplied to the lower chamber 104 of the settling tank 94. As illustrated in FIG. 3, the slurry supplied from the supply port 98 flows from the supply port 98 toward the central axis of the settling tank 94. As a result, the slurry collides with the settling-promoting baffle 108, causing the shiny flow to alter direction downward. The slurry then flows down through the lower chamber 104 either through the space between the settling-promoting baffle 108 and the inclined wall 112, or the space between adjacent inclined walls 112.

During this process of the slurry flowing down through the lower chamber 104 in the manner described above, the catalyst particles within the slurry settle out and accumulate in the lower portion of the lower chamber 104 (the bottom wall section of the settling tank 94), thereby producing a concentrated slurry in the lower portion of the lower chamber 104, and causing the slurry to separate into a concentrated slurry and a clarified slurry within the lower chamber 104. As the slurry flows through the space between the settling-promoting baffle 108 and the inclined wall 112, or the space between adjacent inclined walls 112, at least a portion of the catalyst particles within the slurry settle on top of one of the inclined walls 112. However, in the present embodiment, because the angle of inclination $\theta$ of the inclined walls 112 is at least as large as the angle of repose of the catalyst particles, these catalyst particles that have settled on the inclined wall 112 continue to descend smoothly down the inclined wall 112 to the lower end of the wall, and then fall down through the lower chamber 104 from the lower end of the inclined wall 112.

This concentrated slurry production step can be continued, for example, until the amount of slurry left inside the bubble column reactor 30 becomes small enough to make extraction difficult.

Meanwhile, in the extraction step, first, the slurry supplied from the supply port 98 to the lower chamber 104 in the aforementioned concentrated slurry production step forces an equivalent volume of the clarified slurry from the lower chamber 104 into the connection passage 110. As a result, the clarified slurry inside the connection passage 110 is pushed into the upper chamber 106, the clarified slurry inside the upper chamber 106 is pushed through the through-holes 124 and into the oil collection tube 122, and the clarified slurry inside the oil collection tube 122 is pushed out and extracted through the extraction port 102.

This completes the extraction step.

As illustrated in FIG. 3, in the present embodiment, the regulation device 118 is provided inside the connection passage 110, and therefore during the extraction step, the catalyst particles can be prevented from ascending as the clarified slurry flows up through the inside of the connection passage 110, thereby suppressing the entry of catalyst particles into the upper chamber 106. In the example illustrated in the drawings, because the baffle plates 120 are inclined downward from the inner peripheral surface of the connection passage 110 toward the passage axis of the connection passage 110, ascent of the catalyst particles inside the connection passage 110 can be reliably regulated.

Moreover in the present embodiment, because the flow surface area of the through-holes 124 is larger than the flow surface area of the extraction port 102, the flow rate of the clarified slurry as it passes through the through-holes 124 can be reduced to a rate that is lower than the flow rate of the clarified slurry as it is extracted from the extraction port 102. As a result, catalyst particles within the clarified slurry can be inhibited from flowing through the through-holes 124 and entering the oil collection tube 122, meaning discharge of catalyst particles from the extraction port 102 can be suppressed.

In the present embodiment, because the aforementioned narrow space 116 is provided between the lower end of the settling-promoting baffle 108 and the channel wall 114, any catalyst particles that settle inside the upper chamber 106 can move through this narrow space 116 and into the lower chamber 104.

As illustrated in FIG. 2, the clarified slurry extracted from the settling tank 94 in the extraction step passes through the clarified line 86, is reduced in pressure by the pressure reducing valve 146, and is then supplied to the centrifugal separator 88. A centrifugal separation step is then performed by using the centrifugal separator 88 to separate the clarified slurry into a residual catalyst-containing slurry and a separated oil. The separated oil obtained in this centrifugal separation step is stored in the separated oil tank 148.

Further, after the aforementioned concentrated slurry production step has been started, a first discharge step of discharging the concentrated slurry from the settling tank 94 is performed. This first discharge step may be started, for example, when the interface detection device 126 detects that the settling interface of the concentrated slurry has reached a predetermined height threshold.

In the first discharge step, the first lower line 136 is initially closed by the first lower valve 140. First, the first upper valve 138 is operated so as to open the first upper line 132, and the concentrated slurry inside the settling tank 94 is discharged through the first upper line 132 and into the temporary hopper 134. Subsequently, the first upper valve 138 is operated so as to close the first upper line 132, the first lower valve 140 is then operated to open the first lower line 136, and the concentrated slurry inside the temporary hopper 134 is discharged through the first lower line 136. At this time, the concentrated slurry inside the temporary hopper 134 is pressurized using the first hopper pressurization device 144, enabling the concentrated slurry to be discharged reliably from the temporary hopper 134.

This completes the first discharge step. In this manner, the first discharge step can be performed with the connection between the settling tank 94 and the external atmosphere via the first discharge unit 84 maintained in a sealed state.

The residual catalyst-containing slurry separated by the centrifugal separation step described above is subjected to a second discharge step of discharging the slurry from the centrifugal separator 88.

In this second discharge step, the second upper line 150 and the second lower line 154 are initially closed by the valves 156 and 158 respectively. First, the second upper valve 156 is operated so as to open the second upper line 150, and the residual catalyst-containing slurry inside the centrifugal separator 88 is discharged through the second upper line 150 into the residual catalyst hopper 152. Subsequently, the second upper valve 156 is operated so as to close the second upper line 150, the second lower valve 158 is then operated to open the second lower line 154, and the residual catalyst-containing slurry inside the residual catalyst hopper 152 is discharged through the second lower line 154. At this time, the residual catalyst-containing slurry inside the residual catalyst hopper 152 is pressurized using the second hopper pressurization device 160, enabling the residual catalyst-containing slurry to be discharged reliably from the residual catalyst hopper 152.

This completes the second discharge step.

The residual catalyst-containing slurry discharged in the first discharge step and the residual catalyst-containing slurry discharged in the second discharge step are discharged, as the aforementioned discharged slurry, into the cooling hopper 162 of the solidified slurry production unit 91. Once at least one of the first discharge step and the second discharge step has been started, a solidified slurry production step of cooling the discharged slurry and solidifying the oil medium within the discharged slurry to produce a solidified slurry, and a recovery step of recovering the solidified slurry are performed.

In the solidified slurry production step, cooling water is supplied to the inside of the cooling hopper 162 by the cooling device 164, and the discharged slurry is cooled to produce a solidified slurry.

Then, in the recovery step, this solidified slurry is first crushed by the crushing device 166 inside the cooling hopper 162. In the solidified slurry, the surface of the catalyst particles is coated with the solidified oil medium.

Subsequently, following discharge of the solidified slurry from the opening in the lower portion of the cooling hopper 162, the transport device 170 is used to transport the solidified slurry to the catalyst-receiving tank 168 while removing the cooling water from the slurry. At this time, because the solidified slurry is transported by the transport device 170, operations that must be performed by an operator in the vicinity of the cooling hopper 162 can be reduced.

Gas is generated from the discharged slurry inside the cooling hopper 162, and this gas is disposed of through the gas disposal line 172.

As described above, by employing the catalyst separation and recovery system according to the present invention and using the system to separate a concentrated slurry containing catalyst particles from the slurry extracted from the bubble column reactor 30, the catalyst particles can be recovered from the slurry.

Because the concentrated slurry production unit 82 produces the concentrated slurry continuously, the concentrated slurry can continue to be produced as the slurry is extracted, and the catalyst particles can continue to be separated from the slurry, without halting the extraction of the slurry from the bubble column reactor 30. As a result, unlike the conventional technology described above, the catalyst particles can be separated from the slurry without having to temporarily store the slurry in a storage tank, meaning the catalyst recovery system 80 need not be provided with such a storage tank, or the filters installed outside the storage tank, thus enabling the catalyst recovery system 80 to be simplified and reduced in size.

Furthermore, because the concentrated slurry production unit 82 includes the settling tank 94 described above, the concentrated slurry can be produced continuously by settling, enabling the catalyst recovery system 80 to be further simplified.

Furthermore, because the first discharge unit 84 discharges a concentrated slurry that exhibits superior fluidity to solid catalyst particles, the discharge operation can be simplified. As a result, the catalyst particles can be separated from the slurry with good efficiency.

Moreover, in the recovery mechanism 92, because the concentrated slurry is recovered as a solidified slurry in which the surface of the catalyst particles is coated with the solidified oil medium, contact between the discharged catalyst particles and the air can be suppressed, enabling oxidation of the catalyst particles to be suppressed.

Furthermore, because the aforementioned settling-promoting baffle 108 and the connection passage 110 are provided inside the settling tank 94, the concentrated slurry can be discharged from the settling tank 94 while the clarified slurry is also extracted from the settling tank 94.

Further, because the settling-promoting baffle 108 is inclined in a downward direction from the supply port 98 toward the central axis of the settling tank 94, the flow direction of the slurry supplied to the lower chamber 104 from the supply port 98 can be directed downward. As a result, the catalyst particles within the slurry are able to settle more effectively.

Moreover, because the angle of inclination θ of the inclined wall 112 is at least as large as the angle of repose of the catalyst particles, at least a portion of the catalyst particles within the slurry are able to descend smoothly along the inclined wall 112, enabling more effective settling of the catalyst particles.

In addition, because the settling tank 94 is provided with the tank heating device 128 described above, the oil medium within the slurry inside the settling tank 94 can be prevented from falling in temperature and solidifying, thus enabling more reliable settling of the catalyst particles within the slurry.

Further, because the clarified line 86 is provided with the pressure reducing valve 146 described above, the pressure inside the settling tank 94 can be prevented from falling when the clarified slurry is extracted from the settling tank 94 through the clarified line 86, thus enabling the pressure inside the settling tank 94 to be stabilized.

Furthermore, because the settling tank 94 is provided with the interface detection device 126 described above, the first discharge unit 84 can be operated on the basis of the detected settling interface for the concentrated slurry, enabling the concentrated slurry to be discharged from the settling tank 94.

Moreover, the concentrated slurry can be discharged from the settling tank 94 with the connection between the settling tank 94 and the external atmosphere via the first discharge unit 84 maintained in a sealed state, and therefore the pressure inside the settling tank 94 during discharge of the concentrated slurry can be stabilized.

Furthermore, because the temporary hopper 134 is provided with the first hopper pressurization device 144 described above, the concentrated slurry inside the temporary hopper 134 can be pressurized by the first hopper pressurization device 144, enabling the concentrated slurry to be discharged more reliably from the temporary hopper 134.

In addition, because the temporary hopper 134 is also provided with the hopper heating device 142 described above, the oil medium within the concentrated slurry inside the temporary hopper 134 can be prevented from falling in temperature and solidifying, thus enabling the concentrated slurry to be discharged more reliably from the temporary hopper 134.

Because the residual catalyst hopper 152 is provided with the second hopper pressurization device 160 described above, the residual catalyst-containing slurry inside the residual catalyst hopper 152 can be pressurized by the second hopper pressurization device 160, enabling the residual catalyst-containing slurry to be discharged more reliably from the residual catalyst hopper 152.

Furthermore, because the recovery mechanism 92 includes the crushing device 166 described above, the solidified slurry can be crushed to a size that facilitates post-treatment, enabling the recovered solidified slurry to be more easily subjected to post-treatment.

Moreover, because the cooling hopper 162 is provided with the gas disposal line 172, gas can be prevented from accumulating inside the cooling hopper 162.

Because the FT synthesis unit 5 according to the present embodiment includes the simplified and size-reduced catalyst recovery system 80, the FT synthesis unit 5 can also be reduced in size and simplified.

Moreover, because the liquid fuel synthesizing system 1 includes the simplified and size-reduced FT synthesis unit 5, the liquid fuel synthesizing system 1 can also be reduced in size and simplified.

Although a preferred embodiment of the present invention has been described above with reference to the appended drawings, it should be understood that the present invention is not limited to this particular embodiment. It should be evident to a person skilled in the art that various alternative examples and modified examples can be conceived without departing from the scope of the invention as defined in the claims, and all such alternative examples and modified examples are also deemed to be included within the technical scope of the present invention.

For example, in the embodiment described above, a natural gas is used as the hydrocarbon feedstock supplied to the liquid fuel synthesizing system 1, but the present invention is not limited to this particular example, and other hydrocarbon feedstocks such as asphalt and residual oils may also be used.

Furthermore, in the embodiment described above, the synthesis of liquid hydrocarbons by the FT synthesis reaction was used as an example of the synthesis reaction in the bubble column reactor 30, but the present invention is not limited to this particular configuration. Examples of other synthesis reactions that may be performed in the bubble column reactor include the oxo synthesis (hydroformylation reaction) [$RCH=CH_2+CO+H_2 \rightarrow R—CH_2CH_2CHO$], methanol synthesis [$CO+2H_2 \rightarrow CH_3OH$], and dimethyl ether (DME) synthesis [$3CO+3H_2 \rightarrow CH_3OCH_3+CO_2$].

Further, in the embodiment described above, the cooling hopper 162 of the solidified slurry production unit 91 is provided with the gas disposal line 172, but this gas disposal line 172 may be excluded. Further, the solidified slurry production unit 91 in the present embodiment includes the cooling hopper 162 and the cooling device 164, but a different configuration may also be employed, provided the discharged slurry can be cooled to produce a solidified slurry.

Moreover, in the embodiment described above, the recovery mechanism 92 includes the crushing device 166, the catalyst-receiving tank 168 and the transport device 170, but a different configuration may also be employed, provided the solidified slurry can be recovered from the solidified slurry production unit 91.

Furthermore, in the embodiment described above, the residual catalyst hopper 152 is provided with the second hopper pressurization device 160, but the second hopper pressurization device 160 may be excluded.

Moreover, in the embodiment described above, the catalyst recovery system 80 is provided with the centrifugal separator 88 and the second discharge unit 90, but these units may be excluded. In such a case, the solidified slurry production unit 91 cools the concentrated slurry as the discharged slurry to produce a solidified slurry.

Further, in the present embodiment described above, the temporary hopper 134 is provided with the hopper heating device 142 and the first hopper pressurization device 144, but these devices may be excluded. Furthermore, the first discharge unit 84 is not limited to the configuration described in the above embodiment and may be altered as appropriate, provided it is capable of discharging the concentrated slurry from the concentrated slurry production unit 82.

Moreover, in the embodiment described above, the settling tank 94 is provided with the tank heating device 128 and the interface detection device 126, but these devices may be excluded.

Further, in the embodiment described above, the oil collection tube 122 is provided inside the settling tank 94, but the oil collection tube 122 may be excluded.

Further, in the embodiment described above, the regulation device 118 includes the baffle plates 120, but a different configuration may also be employed, provided the ascent of catalyst particles through the connection passage 110 can be regulated. Moreover, the regulation device 118 may also be excluded.

Furthermore, in the embodiment described above, the inclined walls 112 are provided inside the settling tank 94, but these inclined walls 112 may be excluded. Moreover, in the above embodiment, the settling-promoting baffle 108 is inclined, but a partitioning wall that is not inclined, but simply partitions the lower chamber 104 from the upper chamber 106 may also be used.

Furthermore, in the embodiment described above, the inside of the settling tank 94 is filled with a slurry when the recovery of the catalyst particles is started, but the invention is not limited to this particular configuration. For example, even in those cases where the inside of the settling tank 94 is not filled with a slurry, the inside of the settling tank 94 can simply be filled with a slurry by continuing to supply the slurry from the bubble column reactor 30.

Moreover, the settling tank 94 is not limited to the configuration described in the above embodiment and may be altered as appropriate, provided the slurry inside the settling tank 94 can be concentrated by the settling of the catalyst particles within the oil medium, resulting in a separation of the slurry into a concentrated slurry and a clarified slurry.

Further, the concentrated slurry production unit 82 is not limited to the configuration described in the above embodiment and may be altered as appropriate, provided it is capable of concentrating the slurry extracted from the bubble column reactor 30 to continuously produce a concentrated slurry.

INDUSTRIAL APPLICABILITY

The present invention relates to a catalyst recovery system for recovering catalyst particles incorporated within a slurry contained inside a reactor main unit, wherein the catalyst recovery system includes a concentrated slurry production unit that concentrates the slurry extracted from the reactor main unit and continuously produces a concentrated slurry, a first discharge unit that discharges the concentrated slurry from the concentrated slurry production unit, a solidified slurry production unit that cools the concentrated slurry discharged from the concentrated slurry production unit, thereby solidifying the liquid medium within the concentrated slurry and producing a solidified slurry, and a recovery mechanism that recovers the solidified slurry from the solidified slurry production unit.

The present invention is able to provide a catalyst recovery system which can be simplified and reduced in size, is capable of recovering catalyst particles with good efficiency, and is able to suppress the oxidation of the discharged catalyst particles.

DESCRIPTION OF THE REFERENCE SIGNS

1: Liquid fuel synthesizing system (hydrocarbon synthesis reaction system)
3: Synthesis gas production unit
5: FT synthesis unit (hydrocarbon synthesis reaction apparatus)
7: Upgrading unit
30: Bubble column reactor (reactor main unit)
80: Catalyst recovery system
82: Concentrated slurry production unit
84: First discharge unit
86: Clarified line
88: Centrifugal separator
90: Second discharge unit
91: Solidified slurry production unit
92: Recovery mechanism
94: Settling tank
98: Supply port
100: Discharge port
102: Extraction port
104: Lower chamber
106: Upper chamber
108: Settling-promoting baffle (partitioning wall)
110: Connection passage
112: inclined wall
118: Regulation device
120: Baffle plate
122: Oil collection tube
124: Through-hole
126: Interface detection device
128: Tank heating device
132: First upper line
134: Temporary hopper
136: First lower line
138: First upper valve
140: First lower valve
142: Hopper heating device
144: First hopper pressurization device
146: Pressure reducing valve
150: Second upper line
152: Hopper
154: Second lower line
160: Second hopper pressurization device
162: Cooling hopper
164: Cooling device
166: Crushing device
172: Gas disposal line

What is claimed is:

1. A catalyst recovery system for recovering catalyst particles incorporated within a slurry contained inside a reactor main unit, the catalyst recovery system comprising:

a concentrated slurry production unit that concentrates the slurry extracted from the reactor main unit and continuously produces a concentrated slurry, a first discharge unit that discharges the concentrated slurry from the concentrated slurry production unit,
a solidified slurry production unit that cools the concentrated slurry discharged from the concentrated slurry production unit, thereby solidifying a liquid medium within the concentrated slurry and producing a solidified slurry, and
a recovery mechanism that recovers the solidified slurry from the solidified slurry production unit.

2. The catalyst recovery system according to claim 1, wherein
the concentrated slurry production unit comprises a settling tank, and
the slurry inside the settling tank is concentrated by the catalyst particles settling within a lower portion of the liquid medium, and is then separated into the concentrated slurry and a clarified slurry having a lower catalyst particle content than the concentrated slurry.

3. The catalyst recovery system according to claim 2, wherein
the settling tank comprises:
a supply port through which the slurry is supplied,
a discharge port to which the first discharge unit is connected, and
an extraction port through which the clarified slurry is extracted, and
inside the settling tank there are provided:
a partitioning wall, which partitions the inside of the settling tank into a lower chamber, to which the supply port and the discharge port are connected and which is located within a lower portion of the settling tank, and an upper chamber to which the extraction port is connected and which is located within an upper portion of the settling tank, and
a connection passage that passes through the partitioning wall and interconnects the lower chamber and the upper chamber.

4. The catalyst recovery system according to claim 3, wherein
the partitioning wall is inclined in a downward direction from the supply port toward a central axis of the settling tank.

5. The catalyst recovery system according to claim 4, wherein
an inclined wall that is inclined in a downward direction from the supply port toward a central axis of the settling tank is disposed inside the settling tank beneath the partitioning wall, with a space provided between the inclined wall and the partitioning wall, and
an angle of inclination of the inclined wall is at least as large as an angle of repose of the catalyst particles.

6. The catalyst recovery system according to claim 3, wherein
a regulation device that restricts the catalyst particles from ascending through the connection passage is provided within the connection passage.

7. The catalyst recovery system according to claim 6, wherein
the regulation device comprises a baffle plate that extends from an inner peripheral surface of the connection passage, and
the baffle plate is inclined in a downward direction from the inner peripheral surface of the connection passage toward a passage axis of the connection passage.

8. The catalyst recovery system according to claim 3, wherein an oil collection tube, an inside of which is connected to the extraction port and which blocks connection between the extraction port and the upper chamber, is provided inside the upper chamber,
a through-hole that interconnects inside the oil collection tube with the upper chamber is provided in the oil collection tube, and
a flow surface area of the through-hole is larger than a flow surface area of the extraction port.

9. The catalyst recovery system according to claim 2, wherein
the settling tank comprises a tank heating device that heats an inside of the settling tank.

10. The catalyst recovery system according to claim 2, wherein
the settling tank comprises an interface detection device that detects a settling interface of the concentrated slurry inside the settling tank.

11. The catalyst recovery system according to claim 2, wherein
the first discharge unit comprises:
a first upper line that discharges the concentrated slurry from the settling tank,
a temporary hopper into which the concentrated slurry is discharged from the first upper line,
a first lower line that discharges the concentrated slurry from the temporary hopper,
a first upper valve that opens and closes the first upper line, and
a first lower valve that opens and closes the first lower line.

12. The catalyst recovery system according to claim 11, wherein
the temporary hopper comprises a hopper heating device that heats an inside of the temporary hopper.

13. The catalyst recovery system according to claim 11, wherein
the temporary hopper comprises a first hopper pressurization device that pressurizes an inside of the temporary hopper.

14. The catalyst recovery system according to claim 2, further comprising:
a clarified line through which the clarified slurry is extracted from the settling tank, wherein
a pressure reducing valve that reduces a pressure of the clarified slurry inside the clarified line is provided within the clarified line.

15. The catalyst recovery system according to claim 14, further comprising:
a centrifugal separator to which the clarified slurry is supplied from the clarified line, and
a second discharge unit that discharges a residual catalyst-containing slurry separated from the clarified slurry by the centrifugal separator, wherein
the second discharge unit comprises:
a second upper line that discharges the residual catalyst-containing slurry from the centrifugal separator,
a residual catalyst hopper into which the residual catalyst-containing slurry is discharged from the second upper line, and
a second lower line that discharges the residual catalyst-containing slurry from the residual catalyst hopper, and
the residual catalyst hopper comprises a second hopper pressurization device that pressurizes an inside of the residual catalyst hopper.

16. The catalyst recovery system according to claim 1, wherein the solidified slurry production unit comprises:
a cooling hopper into which the concentrated slurry is discharged and
a cooling device that cools the inside of the cooling hopper, and
the cooling hopper comprises a gas disposal line through which gas inside the cooling hopper is discarded.

17. The catalyst recovery system according to claim 1, wherein
the recovery mechanism comprises a crushing device that crushes the solidified slurry.

18. A hydrocarbon synthesis reaction apparatus that synthesizes hydrocarbon compounds by bringing a synthesis gas comprising hydrogen gas and carbon monoxide gas as main components into contact with a slurry prepared by suspending solid catalyst particles within a liquid medium, the apparatus comprising:
a reactor main unit that contains the slurry and is supplied with the synthesis gas, and
the catalyst recovery system according to claim 1.

19. A hydrocarbon synthesis reaction system comprising:
the hydrocarbon synthesis reaction apparatus according to claim 18,
a synthesis gas production unit that reforms a hydrocarbon feedstock to produce the synthesis gas, and supplies the synthesis gas to the reactor main unit, and
an upgrading unit that produces liquid fuels from the synthesis gas.

20. A catalyst recovery process for recovering catalyst particles incorporated within a slurry contained inside a reactor main unit, the catalyst recovery process comprising:
a concentrated slurry production step of concentrating the slurry extracted from the reactor main unit and continuously producing a concentrated slurry,
a solidified slurry production step of cooling the concentrated slurry, thereby solidifying a liquid medium within the concentrated slurry and producing a solidified slurry, and
a recovery step of recovering the solidified slurry.

* * * * *